United States Patent [19]

McAlister

[11] 4,401,105

[45] Aug. 30, 1983

[54] SOLAR HEATING SYSTEM, AND IMPROVED HEAT COLLECTING AND RADIATING COMPONENTS, FOR LIVESTOCK-CONFINING BUILDINGS

[76] Inventor: Roy E. McAlister, 5285 N. Red Rock Dr., Phoenix, Ariz. 85018

[21] Appl. No.: 304,877

[22] Filed: Sep. 23, 1981

[51] Int. Cl.³ ............................................. F24J 3/02
[52] U.S. Cl. ................................. 126/422; 126/431; 126/437; 165/53
[58] Field of Search ............... 126/421, 419, 422, 436, 126/426, 430, 431, 432, 437, 447, 448; 165/53

[56] References Cited

U.S. PATENT DOCUMENTS

| | | | |
|---|---|---|---|
| 2,559,869 | 7/1951 | Gay | 126/431 |
| 4,054,246 | 10/1977 | Johnson | 126/431 |
| 4,066,856 | 2/1977 | Nilsson | 126/431 |
| 4,154,292 | 5/1979 | Herrick | 126/437 |
| 4,169,461 | 10/1979 | Haug | 126/437 |
| 4,191,166 | 3/1980 | Saarem | 126/422 |
| 4,201,192 | 5/1980 | Coxon | 126/422 |
| 4,227,566 | 10/1980 | Stilber | 126/431 |
| 4,270,596 | 6/1981 | Zinn et al. | 165/49 |
| 4,303,058 | 12/1981 | Chun | 126/431 |
| 4,304,219 | 12/1981 | Currie | 126/422 |

Primary Examiner—Daniel J. O'Connor
Attorney, Agent, or Firm—Cushman, Darby & Cushman

[57] ABSTRACT

A system for heating a building adapted to confine animals includes a solar collector, means for storing the heat absorbed by the collector and heat radiating floor mats which use such heat. The collector includes panels each having lightweight, clear, parallel plastic tubes secured at their ends to headers of similar material. The tubes are disposed in troughs in the panel base having inclined reflective side walls to concentrate reflected solar energy on the tubes. The heat radiating floor mats comprise tubes and headers like those used in the solar collector panels.

1 Claim, 16 Drawing Figures

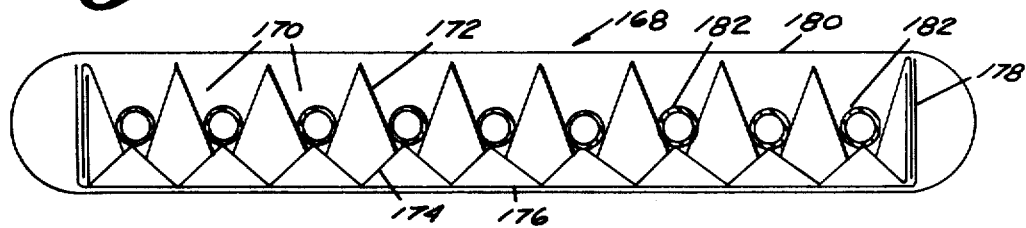
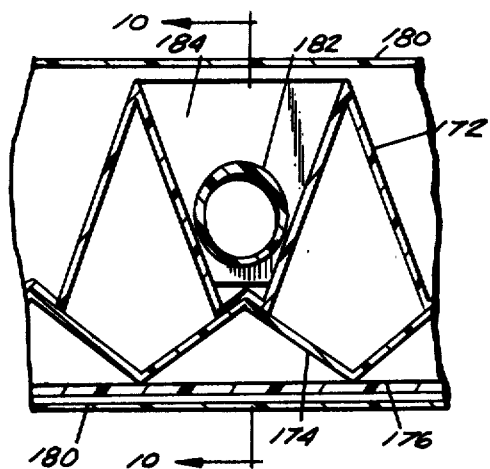
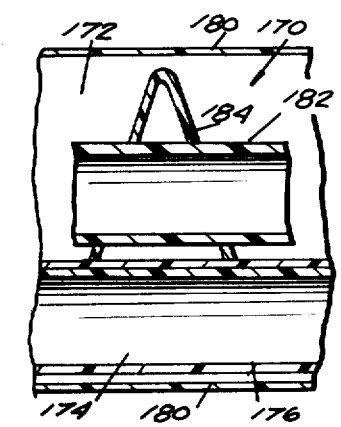
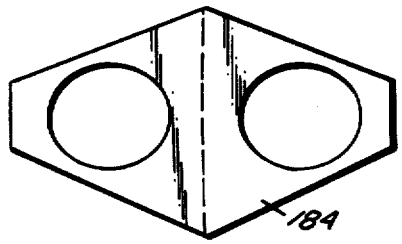
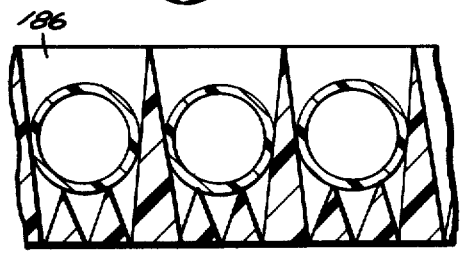
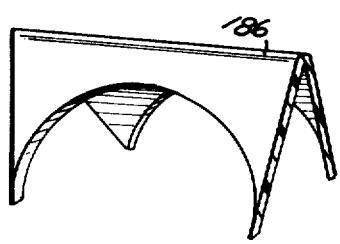

Fig. 15
OUT    IN
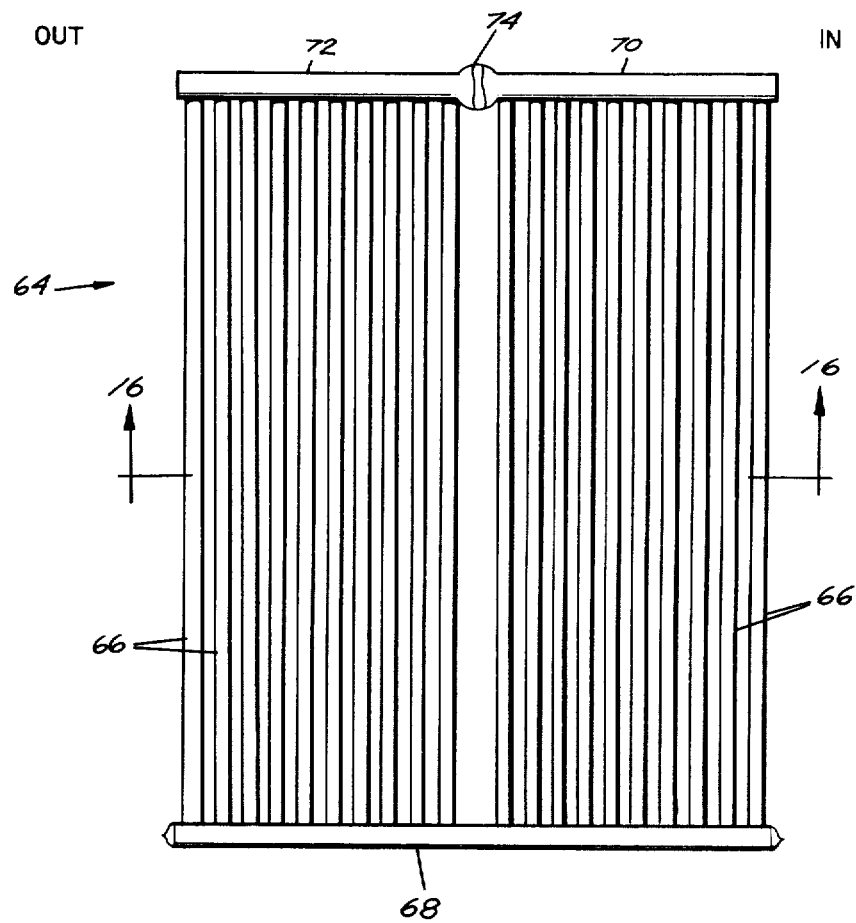
Fig. 16
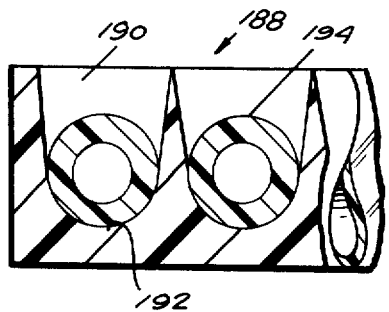
Fig. 14

SOLAR HEATING SYSTEM, AND IMPROVED HEAT COLLECTING AND RADIATING COMPONENTS, FOR LIVESTOCK-CONFINING BUILDINGS

BACKGROUND OF THE INVENTION

This invention relates to an improved, cost effective, simple system for collecting, storing and using solar energy. The system is especially adapted for replacing energy supplies now used in confinement breeding, farrowing, and feeding of farm livestock, especially animals, and to provide for the continued maintenance of their comfort in the event of loss of auxiliary conventional electric power. The invention also relates to an improved, low-cost, rugged, efficient, light-weight, practical solar energy collector.

Solar energy systems have been in use for many, many years, but have not been used extensively for agricultural purposes, i.e. the heating of farm buildings where farm livestock is confined. This invention provides a practical system for collecting, storing and using solar energy especially adapted for that purpose. It also provides for an increased survival rate for newborn farm livestock by establishing preferred temperatures and improved conditions of sanitation.

Other objects and advantages of the invention will become apparent from the following description and accompanying drawings in which:

BRIEF DESCRIPTION OF THE DRAWINGS

FIG. 8 is a view corresponding to FIG. 3 of a third modification of the energy collector.

FIG. 9 is an enlarged fragmentary view corresponding to FIG. 8 of a fourth modification of the energy collector.

FIG. 10 is a sectional view taken on line 10—10 of FIG. 9.

FIG. 11 is a plan view of the unfolded sheet forming the tab shown in FIGS. 9 and 10.

FIG. 12 is an enlarged fragmentary view corresponding to FIG. 3 of a fifth modification of the energy collector.

FIG. 13 is a perspective view of the hold down tab shown in FIG. 12.

FIG. 14 is a view corresponding to FIG. 3 of a sixth modification of the energy collector.

FIG. 15 is a plan view of the heat radiating mat shown in FIG. 2.

FIG. 16 is a sectional view taken on line 16 of FIG. 15.

DETAILED DESCRIPTION OF THE INVENTION

Figure 1:
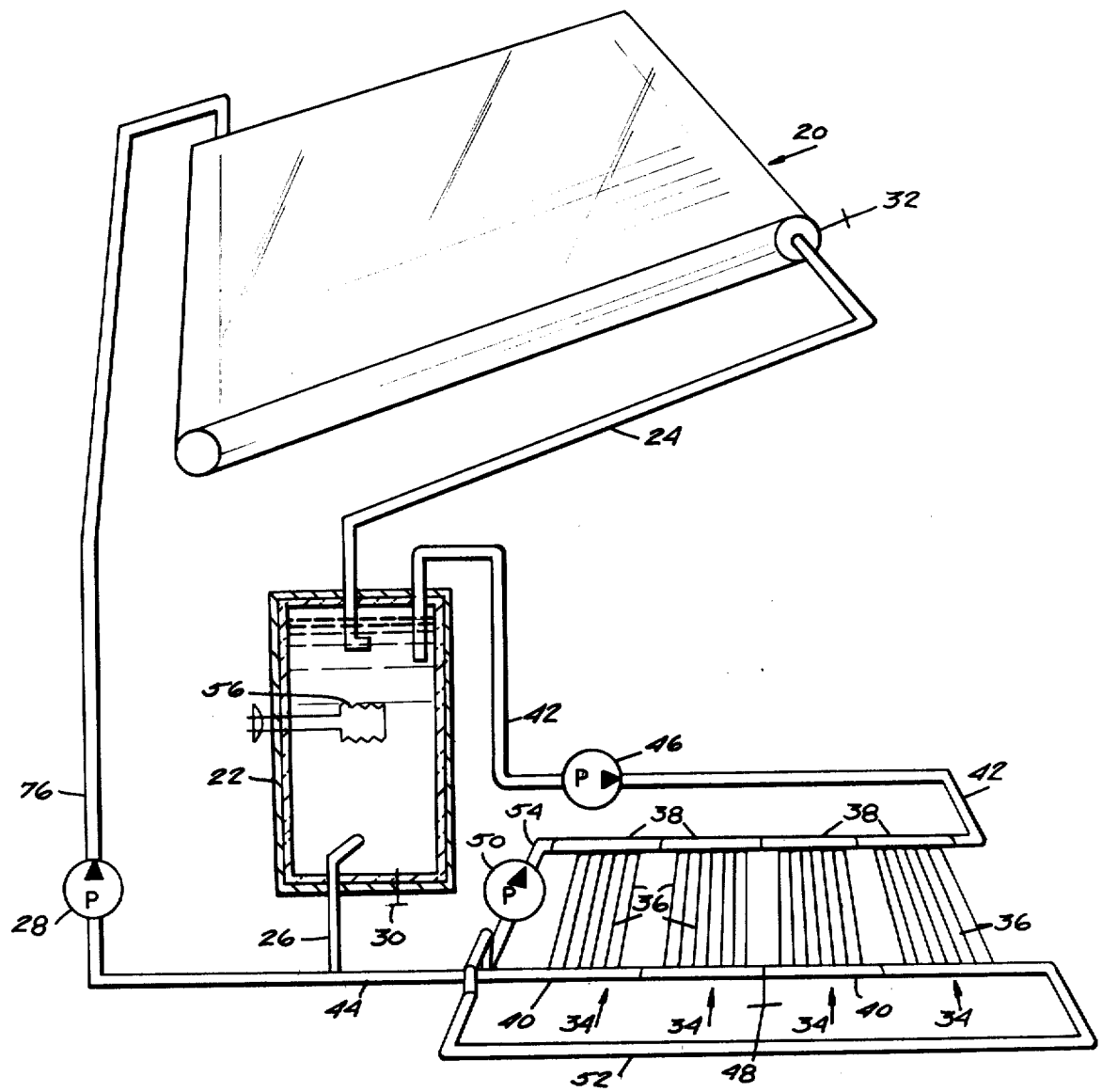
FIG. 1 is a schematic diagrammatic view of a solar energy system embodying this invention.

Referring now to FIG. 1 of the drawings there is shown a system embodying this invention for collecting, storing and using solar energy for heating a farm building (not shown), for example, for the confinement of sows and their piglets. The system includes a solar collector 20 adapted to have water passed therethrough and heated therein and to be supported on the roof or south wall (in the northern hemisphere) of the building for maximum exposure to solar radiation. The system also includes an insulated tank or reservoir 22 for storing water heated in the collector 20. For this purpose, a conduit 25 leads from the outlet of the collector 20 to the upper portion of the tank 22, while a conduit 26 leads from the lower, cooler portion of the tank to the inlet of the collector. A pump 28 is connected into the conduit 26 for circulating water through the collector 20. The pump 26 desirably is controlled through suitable conventional circuitry (not shown) by temperature sensors, one 30 at the lower portion of the tank 22 and one 32 at the outlet of the collector 20, the control being such that whenever the temperature at the outlet exceeds that in the lower portion of the tank, i.e. solar energy is available for heating the water in the tank, the pump circulates water through the collector where it is heated and subsequently stored in the tank.

The heated water in the tank 22 is circulated through one or more heat radiating floor mats 34. Four parallel-connected mats 34 are shown in FIG. 1. Each mat 34 has a plurality of parallel heat radiating tubes 36 connected at their opposite ends to inlet and outlet headers 38 and 40, respectively. In the parallel connections shown in FIG. 1, the inlet headers 38 are connected at their ends to form a common inlet header and the outlet headers 40 are similarly connected to form a common outlet header. A conduit 42 leads from the upper portion of the tank 22 to one end of the common inlet header, while another conduit 44 leads from the corresponding other end of the common outlet header to the conduit 26 adjacent the tank. A pump 46 is connected into the conduit 42 to circulate heated water from the tank 22 through the floor mats 34. The pump 46 is controlled by a temperature sensing device 48 at about midway of the length of common outlet header to circulate heated water whenever the temperature sensed by the device is below a selected temperature. For newborn piglets the selected temperature would be about 90° F.

The tubes 36 and headers 38,40 of the mats 34 preferably are made of polyolefin tubing, such as polybutylene, with the tubes being of the order of ⅜" O.D. and ¼" I.D. For use with animals, as described above, such mats 34 possess numerous advantages:

1. Satisfactorily withstand expected physical abuse, such as animal biting or clawing and heavy animal or human foot traffic.
2. Do not suffer chemical degradation due to fecal matter or urine.
3. Easily cleaned by washing with water, as with a hose.
4. Will not fail on repeated freezing of water therein. Thus, are suitable for use in buildings that are heated only periodically.

For use with swine, for example, mats 34 preferably are placed between tethered or closely-confined sows so that piglets resting safely away from their mothers will be heated by the mats. The mats 34 are extremely useful to lay over drain gutters covered with steel grates (not shown). They are then easily cleaned by temporarily removing the animals, e.g. pigs, and spray washing fecal matter from the mats 34 into the drain below. Disinfectant can be added to the spray water which also can be heated by the above-described system.

There are significant improvements in thermodynamic efficiency in having the mats 34 on the floor in contact with newborn pigs, chickens, etc., rather than being embedded in or located below concrete floors. Further the floor mats 34 permit quick and easy floor plan changes to suit herd sizes and multiple use needs for a building. Any needed repair can be accomplished far more readily and quickly than for concrete covered heaters. Further, the mats 34 pose none of the problems attendant electric heaters, such as electric shocks or fires. The thermal efficiency of the mats 34 typically is from ten to fifty times higher than that of electrical resistance heated floors and at least five times as efficient as below grade hot water circuits.

In the event numerous mats 34 are used, it is desirable to provide continuous circulation of water therethrough to achieve a highly averaged temperature among the mats. For this purpose a continuously operating circulating pump 50 may have the pump inlet connected, via a conduit 52, to the end of the common outlet header opposite that to which the conduit 44 is connected and its outlet connected, via a conduit 54, to the end of the common inlet header opposite that to which the conduit 42 is connected. Thus, whenever the pump 46 is not operating and pump 28 is operating, water will be circulated from the tank 22, through the collector 20 where it is heated, and back to the tank. On the other hand when both pumps 28 and 46 are operating, water will be circulated from both the tank 22 and the mats 34 through the collector and back to the tank.

Figure 2:
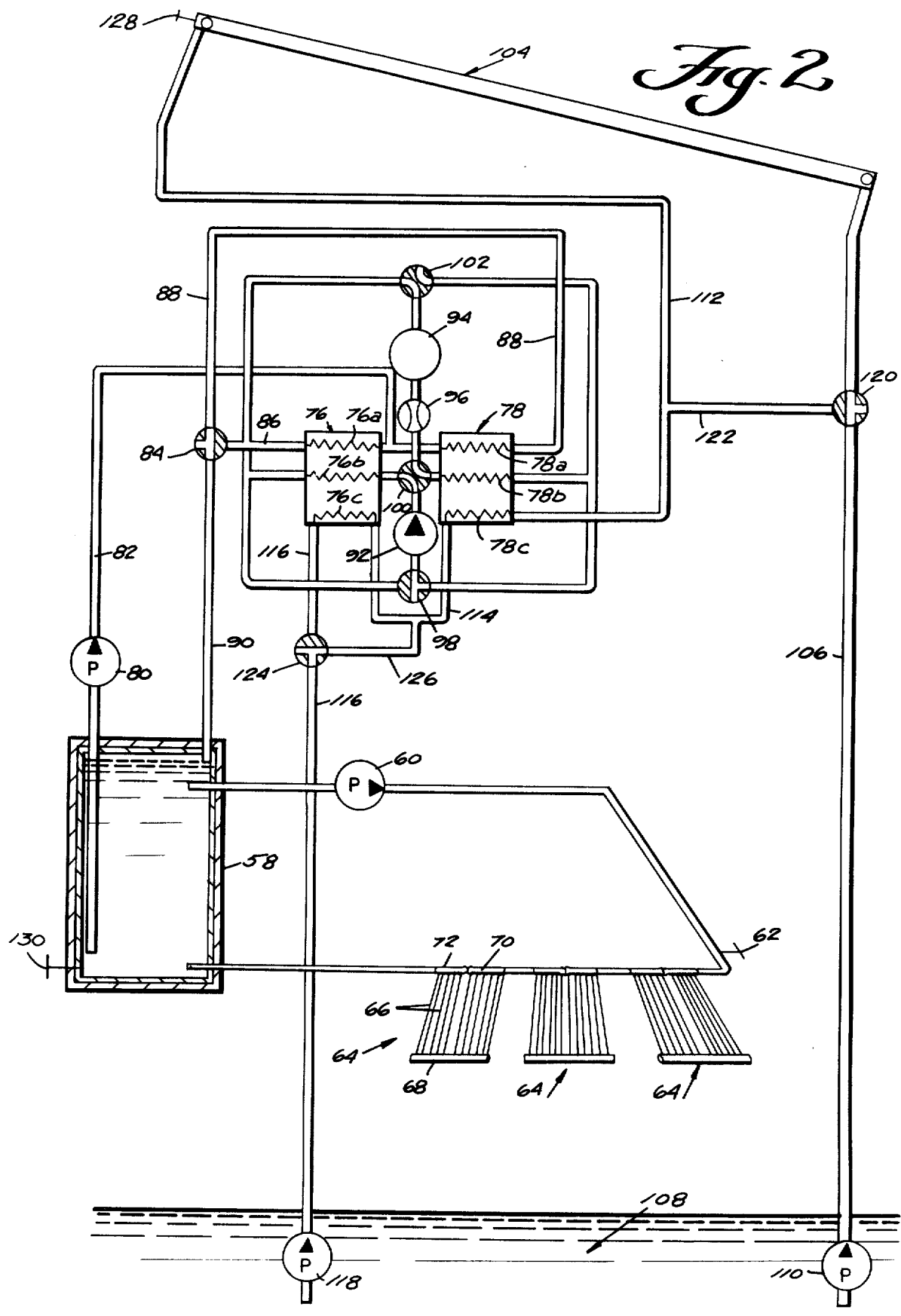
FIG. 2 is a view corresponding to FIG. 2 of a modified form of a solar energy system embodying this invention.

Preferably the tank 22 has an auxiliary heater 56 to supply heat, as required, whenever solar energy is not available. The heater 22 may be controlled in a conventional manner by the temperature sensor 30 or another appropriate sensor (not shown) of water temperature in the tank. In small installations the heater 56 preferably is fired by fluid fuel, e.g. natural gas, liquefied petroleum gas, or oil. In large installations auxiliary heat preferably is supplied to the tank by an engine-driven heat pump which extracts heat from ground water in the winter but uses such ground water for cooling purposes in the summer. Such a heat pump system is shown in FIG. 2.

This system, like that shown in FIG. 1, includes an insulated storage tank 58 from which water is circulated, by a pump 60 on demand by a temperature sensor 62, through a number of floor mats 64 and returned to the tank. Such mats 64 may be connected in series, as shown, instead of in parallel as shown in FIG. 1. As shown best in FIG. 15, the mat tubes 66 may be connected to a single header 68 at one end, but at the other end half the tubes are connected to a short header 70 and half to another short header 72. These short headers 70,72 can be fabricated from a single long header by squeeze welding the latter together at the midpoint of its length, as at 74. The inlet connection to each mat 64 is made to one header 70 and the outlet connection to the other header 72, to in effect provide two series-connected half size mats in one mat.

The system also includes two multiple-fluid heat exchangers 76, 78, each having three closed paths 76a, 76b, 76c, 78a, 78b, and 78c, respectively, for fluid, preferably constructed according to the disclosure of my copending application Ser. No. 32,639 for "Multiple Fluid Medium System and Improved Heat Exchanger Utilized Therein". Water is circulated selectively alternatively from the tank 58 through the first path a of one of the exchangers 76 or 78, and then returned to the tank by a pump 80 in a line 82 which leads from the tank to the inlets of the first paths a of both heat exchangers 76 and 78 and a shuttle or two-way valve 84 connected to lines 86 and 88 leading from the outlets of the paths 76a and 78a, respectively, and to a single return line 90 leading to the tank.

The system also has a refrigerant circuit including a compressor 92, the second path b of one of the heat exchangers 76 or 78, an accumulator 94, an expansion valve 96 and the second path b of the other heat exchanger 78 or 76. Shuttle or two-way valves 98, 100 and 102 are connected into the refrigerant circuit to selectively and alternatively pass compressed heated refrigerant through the second path b of the other exchanger 78 or 76 before being returned to the compressor 92. Thus, the valves 98, 100 and 102 may be selectively operated to either heat or cool the water in the tank 58 by heat exchange with either compressed heated refrigerant or expanded cooled refrigerant.

The system further includes a solar collector 104, like the collector 20 shown in FIG. 1, through which ground water is circulated for alternative heating or heat sink purposes. For this purpose a line 106 leads from an aquifer 108 to the inlet of the collector 104 and a pump 110 is connected into the line to draw ground water from the aquifer and circulate it through the collector. The outlet of the collector 104 is connected, by a line 112, to the third path c of the heat exchanger 78 which is connected, by a line 114, in series with the third path c of the other heat exchanger 76, which in turn is connected by a line 116, having a pump 118 therein, to the aquifer 108. A two-way valve 120 is connected into the line 106 and to a by-pass line 122 connected to the line 112, while a two-way valve 124 is connected into the line 116 and to a by-pass line 126 connected to the line 114 series-connecting the third paths c of the heat exchangers 76 and 78.

Thus, during winter operation of the system the pump 110 and valve 120 are operated to circulate ground water through the solar collector 104. The ground water, heated in the solar collector 104, is then passed through the third path c of the heat exchanger 78 to heat the water being circulated through the first path a thereof from the tank 58. From the heat exchanger 78 the ground-water is returned to the aquifer 108 through the third path c of the heat exchanger 76, or through the by-pass line 126, and the line 116, while the pump 118 is inoperative.

In the event temperature of a sensor 128 at the outlet of the collector 104 is less than that of a sensor 130 in the lower portion of the tank 58, i.e., insufficient solar energy is available for heating, as at night or during cloudy days, conventional circuitry is utilized to put the compressor 92 in operation, move the valve 120 to by-pass the collector 104 with the ground water, and to operate the valves 98, 100 and 102 so that heated compressed refrigerant and water from the tank 58 are circulated through the heat exchanger 76 to heat the water in the tank, while at the same time ground water and expanded cooled refrigerant are circulated through the heat exchanger 78 to thereby extract heat from the ground water.

In the summer, the same system can be used for cooling purposes. At this time, the pump 110 is inoperative and the pump 118 operated to circulate ground water through the heat exchanger 76 or 78 to cool the water being circulated therethrough from the tank 58. The thus somewhat warmed water is passed through the solar collector 104 where in the proces of being heated the water intercepts about 50% of the solar energy heat load on the building. The thus further heated ground water is returned to the aquifer 108 through the line 106, and the then inoperative pump 110.

Figure 3:
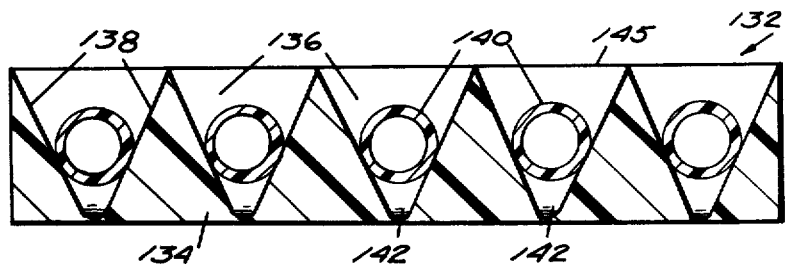
FIG. 3 is an enlarged sectional somewhat diagrammatic view of a panel of the solar energy collector shown in FIG. 1.

Referring now to FIG. 3 of the drawings, there are shown details of a first embodiment of a panel 132 of the solar collector 20 which usually is made up of a plurality of panels. The panel 132 which is rectangular, may be of the order of 1" in thickness, 2' wide and of a practical length, e.g. 4' to 40'. In this arrangement a generally rectangular base panel 134 is formed of phenolic-bound rock wool or fiberglass having generally V-shaped troughs or channels 136 extending longitudinally of the base panel. The surfaces 138 of the channels 136 are made reflective, as by adhering thereto very thin, e.g. 0.005" thickness, aluminum foil or a film of the order of 0.001" thickness of a polymer, such as nylon, polyethylene terephthalate or polyolefins, having a vapor deposition of aluminum thereon. Alternatively the surfaces 138 of the channels 136 can be made reflective by the application thereto of a white latex formulation. Supported in each channel 136 is a tube 140, preferably of polybutylene, poly-4-methyl-1 pentene, polysulfone or fluoropolymer, thermoplastic, and of the order of ½" in diameter, connected at each end to a larger manifold 142 of the same material, as shown, for example, in FIGS. 6 and 7. The connections preferably are made by the methods disclosed in my copending application Ser. No. 32,635 for "Method and Apparatus for Manifolding Multiple Passage Solar Panels". The reflective surfaces 138 of the channels 136 causes concentration of incident solar energy on the tubes 140. For reasons latter explained, secured to and extending along each manifold 142 for its full length are a plurality, e.g. three, generally uniformly circumferentially spaced small tubes 144 which may be of the same material as the manifold.

The tubes 140 and manifolds 142 preferably are pressure tested for leaks and annealed, if necessary, after being connected and prior to their mounting to the base panel 134 in order to facilitate regrinding and recovery of resin if leaks are present.

The base panel 134, tubes 140 and manifolds 142 are enclosed in a tube 145 shrunk thereover to make such assembly sufficiently rigid to support foot traffic and prevent hail damage. The shrink tube 145 also performs transparent packaging and glazing functions. The shrink tube 145, which preferably is of a fluoropolymer, such as polyvinylidene fluoride, ethylene-chlorotrifluoroethylene or vinylidene chloride-tetrafluoroethylene copolymer, has a film thickness of the order of 0.012". The shrink tube 145 preferably is about 150% larger in preshrunk perimeter than that of the largest cross-section perimeter of the assembly of the base 134, tubes 140 and manifolds 142, with their attached tubes 145, and about 110% longer.

Figure 7:
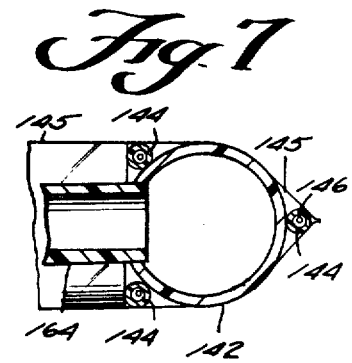
FIG. 7 is a sectional view taken on line 7—7 of FIG. 6.

The shrink tube 145 is heat-sealed closed at both ends, as shown in FIG. 7, over the tubes 145, after enclosure of the assembly therein and then punctured at about mid-width to allow escape of air during heat shrinkage. This desirably is accomplished by passage of the panel 132 through a uniformly heated tunnel on a powered conveyor (neither shown). The panels 132 preferably are shipped with the ends of the manifolds 142 covered by the shrink tube 145 to keep out dust, debris and insects. For installation of the panels 132, the heat shrink tube 145 is cut away over the ends of the manifolds 142 to allow panel-to-panel connections of the manifolds by insertion in the ends thereof of thin-walled fiber-reinforced bellows tubes (not shown) generally as shown in FIG. 11 of my copending patent application Ser. No. 32,634, but preferably with the largest bellows section diameter about equal to the outside diameter of the manifolds 142.

Figure 6:
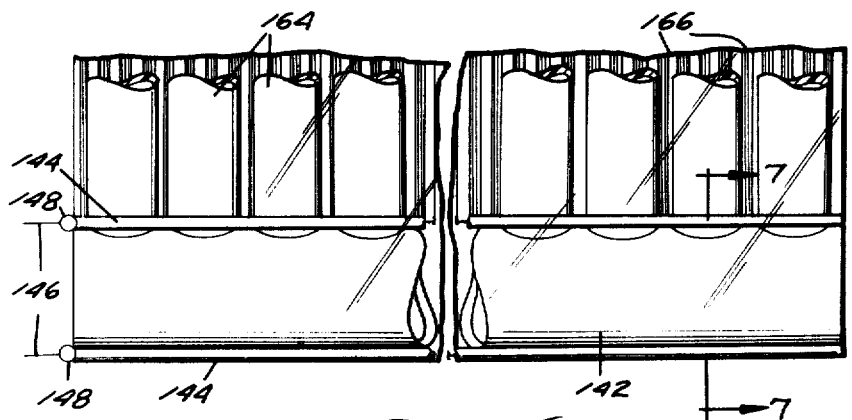
FIG. 6 is a fragmentary plan view of one end of the energy collector shown in FIG. 5.

After installation and connection of the panels 132, the panel array is further mechanically secured and strengthened by insertion of high strength wires 146, preferably of stainless steel, through the aligned tubes 144 of the manifolds 142 of the panels. Those portions of the wires 146 projecting out of the tubes 144 on the outermost panels 132 of the array have antimotion grip beads 148, common in the wire and cable industry, mounted thereon and engaged against the end of the corresponding tube 144, as shown in FIG. 6. Such beads 148 restrain movement of the panels 132 along the wires 146 and thereby reduce strain longitudinally of the manifolds 142 resulting from working fluid pressure therewith.

Figure 4:
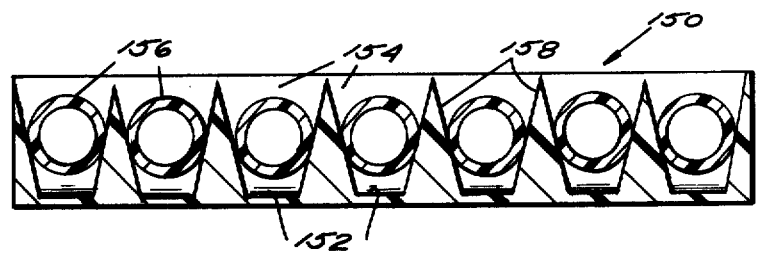
FIG. 4 is a view corresponding to FIG. 3 of a first modification of the energy collector.

A second embodiment of a collector panel is shown in FIG. 4. This panel 150 is substantially the same as that shown in FIG. 3 except that the bottoms 152 of the channels 154 are flat, the spacing between the tubes 156 is less and the outward inclination of the side wall surfaces 158 is less. The result is that more tubes can be used in a panel of given width with a resulting greater cross-sectional area for fluid flow. This configuration is preferred for longer panels and for low specific heat working fluids.

Figure 5:
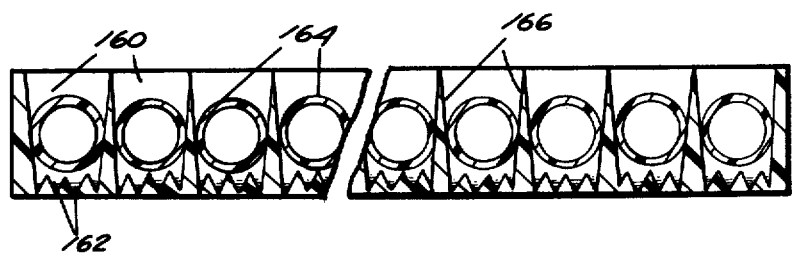
FIG. 5 is a view corresponding to FIG. 3 of a second modification of the energy collector.

A third panel embodiment is shown in FIG. 5. In this the bottoms of the channels or troughs 160 have a plurality of narrow V-shaped grooves 162 therein, and the spacing between the tubes 164 and the outward inclination of the side wall surfaces 166 of the channels 160 is even less than that shown in FIG. 4 with even greater cross-sectional area for flow of the working fluid.

A fourth solar-collector panel embodiment is shown in FIG. 8. This panel 168 is particularly rugged but light-weight. The channels 170, which have inverted V-shaped bottoms, are provided by folds in a 0.006" thick film sheet 172 of equal molar percentages ethylene-terephthalate-butylene-terephthalate copolymer aluminized to 1,000 angstroms or 98% reflectivity of solar wavelengths for orthogonal entry rays. The bottoms of the channels 170 are nested on and adhered to the apices of V-folds in a support sheet 174 of the same film as the sheet 172. The cooperating truss folds of the two sheets 172, 174 are retained against flattening by adhering the edge folds of a flat bottom sheet 176 to the edge folds of the sheets 172 and 174, as at 178, and also adhering the sheet 176 to the sheet 174 along the lines of contact therebetween. The sheet 176, which is a 0.001" thick film of polymer such as polyethylene-terephthalate, may have instructions printed on its outer surface respecting installation and use of the panel 168. The shrink tube 180, which is illustrated in FIG. 8 prior to shrinkage and may be a 0.003" thick film of fluorinated-ethylene-propylene, further prevents flattening of the folds of the sheets 172 and 174 in addition to the other functions mentioned above.

The tubes 182 in the channels 170 have an outside diameter of the order of 0.25" and a wall thickness of 0.012" and may be made of clear ethylene-tetrafluoroethylene. The W shape of the channels 170 provides a three line contact with the tubes 182. It has been found experimentally that a 0.27" spacing between the tubes 182 and the shrink film 180 and a concentration ratio of about 2.4 enables maximum all-year solar collection efficiencies for working fluid temperatures, up to about 50° F. above the ambient temperature. Concentration ratio, as used herein, means the overall front area of a collector panel exposed to solar radiation divided by the outside apparent area of the tubes. Concentration is achieved by reflection of considerable portions of incoming solar radiation toward the tubes from the reflective surfaces of the channels.

The panel shown in FIG. 8 has expected weatherability of at least 20 years. It can withstand foot traffic and hailstones, and weighs less than one half a pound per square foot. The use of cooperating folded trussed film sheets, e.g., 172 and 174, as shown in FIG. 8, to support the tubes 182 and the shrink tube 180 while resisting lateral loading is of considerable strength to weight advantage over conventional designs of solar panels.

Radiation concentrating panels using troughs or channels having outwardly inclined reflective side wall surfaces, as shown in FIGS. 3-5 and 8, have optimal relationships based upon the physical, chemical and optical properties of the materials selected. Preferably, the concentration ratio is as high as possible without overheating the radiation-receiving tubes and without requiring tracking or reorientation of the troughs, i.e. the panels, for all-day/all-year collection of incident ratiation. The actual angle for total internal reflection within the films 172, 174 and 180 is a function of the index of refraction of those films. The angle of radiation entering and exiting from the shrink tube film 180 is related to the angle of inclination of the side wall surfaces of the trough 170 shown in FIG. 8 because it is preferred to cause reflection from such surfaces to strike the tube 182. Such tubes 182 can be of any suitable cross-sectional configuration, including elliptical (as shown in FIG. 9) rectangular or triangular, and can be supported at any location within the reflective channels 170 by small apertured tabs 184 of folded plastic sheet, FIGS. 9-11, spaced along the tube, on intervals up to 48" as required by the stiffness of the tubes.

Similar tabs 186 contoured to engage only the upper surface of the tubes may be used to retain the latter in their channels, as shown in FIGS. 12 and 13. Both tabs 184 and 186 preferably have their edges adhered to the side walls of their respective troughs.

Still another embodiment of a collector panel is shown in FIG. 14. The panel 188 there shown is like that shown in FIG. 3 except the troughs 190 have curved bottoms 192 conforming to the curvature of the tubes 194 which fit snugly against and are supported by such bottoms.

The floor heater mats 34, 64, as shown in FIGS. 1, 2, 15 and 16 are constructed substantially the same as the sub-assembly of the solar collector tubes and headers, with tubes 36, 66 of ¼ to 1 inch outside diameter on ½ to 1½ inch centers and headers 38, 40, 68, 70, 72 of ½ to 4 inch outside diameter. The mats can be of any practical width or length, e.g. 2' wide by 5' long. Tube spacing and hold-down details for the mats will depend upon the flooring on which they are installed and the climatological factors of the area in which they are used.

It thus will be seen that the objects and advantages of this invention have been fully and effectively achieved. It will be realized, however, that the foregoing specific embodiments have been disclosed only for the purpose of illustrating the principles of this invention and are susceptible of modification without departing from such principles. Accordingly, the invention includes all embodiments encompassed within the spirit and scope of the following claims.

What is claimed is:

1. A system for heating a building adapted to confine animals comprising:
  at least one heat radiating floor mat adapted to have heated water circulated therethrough and to be installed on the floor of the building, said mat comprising a plurality of parallel tubes having their axes in a common plane and inlet and outlet headers connected respectively to the opposite ends of said tubes;
  a solar collector adapted to heat water circulated therethrough and to be mounted exteriorly of the building for optimum exposure to solar radiation, said collector comprising a plurality of parallel tubes having their axes in a common plane and inlet and outlet headers connected respectively to the opposite ends of said tubes;
  a storage tank for heated water;
  first conduit means connecting said collector outlet header with the top portion of said tank;
  second conduit means connecting said collector inlet header with the lower portion of said tank;
  third conduit means connecting said mat inlet header with said tank;
  fourth conduit means connecting said mat outlet header with said second conduit means adjacent said tank;
  first pump means connected into said third conduit means for withdrawing heated water from said tank and circulating it through said floor mat;
  second pump means connected into said second conduit means for withdrawing water from one of said tank and said mat, depending on whether said first pump means is operating, and circulating it through said solar collector;
  means responsive to a predetermined temperature adjacent said mat controlling said first pump means for operating the same to maintain said predetermined temperature; and
  means responsive to a positive temperature differential between the water in said collector outlet header and the water in said tank lower portion for operating said second pump means whenever the water temperature in said collector outlet header exceeds the water temperature in said tank lower portion.

* * * * *